June 19, 1962      P. P. BIRINGER      3,040,230
SINGLE PHASE POWER SUPPLY SYSTEM HAVING A MULTIPHASE SOURCE
Filed Feb. 7, 1958      2 Sheets-Sheet 1

Inventor
PAUL P. BIRINGER by: *J. Richard Cavanaugh*

Patent Agent

Inventor
PAUL P. BIRINGER by: J. Richard Cavanaugh
Patent Agent

United States Patent Office 3,040,230
Patented June 19, 1962

3,040,230
SINGLE PHASE POWER SUPPLY SYSTEM HAVING A MULTIPHASE SOURCE
Paul P. Biringer, Toronto, Ontario, Canada, assignor, by mesne assignments, to Ajax Magnethermic Corporation, Youngstown, Ohio, a corporation of Ohio
Filed Feb. 7, 1958, Ser. No. 713,943
3 Claims. (Cl. 321—7)

This invention relates to a high power density power supply for induction heating or the like. More specifically the invention concerns a multi phase frequency multiplier having a single phase output of high frequency and high power output.

In the prior art of power supplies for induction heating of that class of heating required for use in induction heating furnaces, it has been necessary to employ special designs of power generators of the rotating class to obtain satisfactory power density in the induction furnaces. It is well known that an induction furnace power system is characterized by apparent inherent low power factor requiring costly power factor correction.

Having regard to the foregoing it is the main object of the present invention to provide a direct power supply for induction heating furnaces adapted to convert a conventional three phase or multi phase standard 60 cycle line frequency or the like to a single phase higher frequency without requiring the use of moving parts and in a physical transformer-like form hereinafter sometimes referred to as a "multiductor" being the device and apparatus of the invention.

It is a further object of the invention to provide an induction heating power supply adapted to convert a multi phase line frequency source to a higher frequency single phase output of high power density of satisfactory power factor.

With the foregoing and other objects in view the invention generally concerns a power supply system adapted to deliver single phase output electrical power at a harmonic of the source frequency and energizable by a multiphase source of electrical power of predetermined frequency, and comprising in combination: means effectively providing a neutral point for said source; a current dependent inductance for each phase of said source energizable by the latter having a current voltage relationship which is non-linear for each phase of said source; means defining a star point for said current dependent inductances; a reactance having a current voltage relationship which is linear disposed between each current dependent inductance and the corresponding phase of said source providing a high impedance path for harmonic components of said frequency reflected by said current dependent inductances, said linear reactances developing non-sinusoidal voltages phase to phase between said linear reactances and current dependent inductances; means interposed between said current dependent inductances for providing a low impedance path phase to phase for harmonic currents passing non-sinusoidal current to said current dependent inductances thereby to energize the latter; and means for connecting a single phase load between said neutral and star points, the relationship between the low impedance means and the high impedance means being such that a substantially unity power factor results at the source.

Reference is made to a co-pending application Serial No. 725,004 filed March 31, 1958 of the same inventor in which the symmetrical self-balanced system disclosed herein is more particularly described and claimed.

With the foregoing and other objects in view the invention will be appreciated in more detail by reference to the following specification disclosing specific practical arrangements by way of illustration in conjunction with the accompanying drawings.

Figure 1:
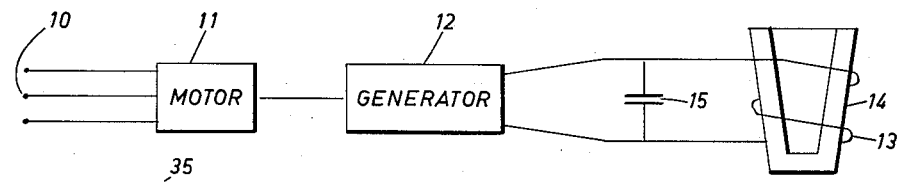
FIGURE 1 is a schematic of a prior art arrangement for supplying power to an induction heating furnace from a multi phase line source.

In FIGURE 1 an electric furnace induction heating system of the prior art is shown wherein a three phase source of alternating current 10 of line frequency, that is sixty cycles per second energizes the three phase motor 11, which in turn drives a single phase high frequency generator 12 energizing the induction heating coil 13 of the induction heating furnace pot structure 14. Condensers 15 may be utilized to accomplish power factor correction.

Figure 2:
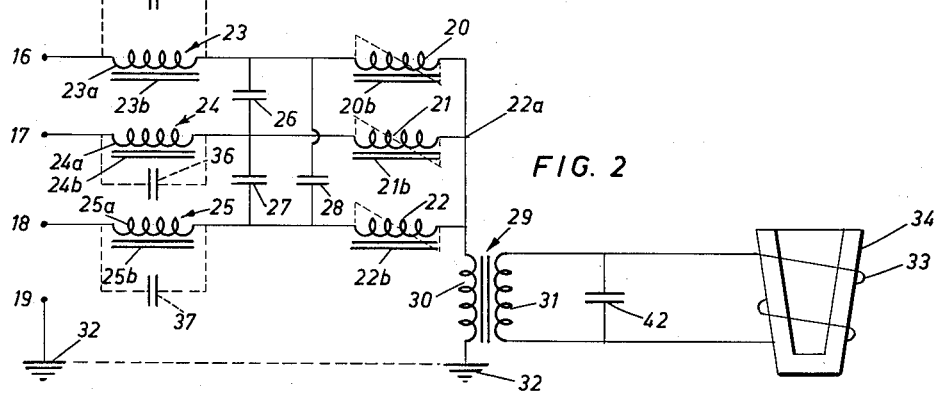
FIGURE 2 illustrates one preferred power system for converting a multi phase power source to a single phase output for induction heating furnace service.

The system of the invention is shown in one suitable form in FIGURE 2. A multi phase source such as a three phase source at terminals 16, 17 and 18 energizes current dependent inductances, i.e. primary structures for each phase of said source having a current voltage relationship which is non-linear for each phase of the source of said inductances are connected in star relation thereby to distort a current wave form to provide a higher harmonic content therein. The source has a neutral point 19 as shown in FIG. 2. The current dependent inductances are separated from the source terminals 16, 17 and 18 by reactances or inductances for current 23, 24 and 25, said reactances having a current voltage relationship which is linear and which preferably may be provided in the form of chokes, having an air gap and a winding 23a, 24a and 25a the latter serving to connect the current dependent inductances 20, 21 and 22 to the source and serving to isolate the source from harmonics, the reactances or chokes 23, 24 and 25 providing a high impedance path for harmonic components of the frequency reflected by the current dependent inductances 20, 21 and 22 and developing non-sinusoidal voltages phase to phase between said linear reactances and each current dependent inductances. Condensers 26, 27 and 28 are connected to be supplied with said non-sinusoidal voltage developed phase to phase between the linear reactances and the current dependent inductances, provide a low impedance path for harmonic currents and pass non-sinusoidal current to said current dependent inductances. A single phase output transformer 29 having a primary 30 and a secondary 31 is connected so that its primary winding 30 is connected to the star connection point 22a and the neutral point or ground 32 of the source. The secondary or output winding 31 serves to energize the induction heating winding 33 of the furnace structure 34 with single phase high frequency power at a harmonic of the source freqnuency.

The chokes 23, 24 and 25 may have associated there-with condensers 35, 36 and 37 respectively connected in parallel with each to create a parallel resonance circuit of a set frequency of fifth to seventh harmonic order.

Each of the cores of the chokes 23, 24 and 25, and inductances 20, 21 and 22 designated by "b" consists of magnetic material such as laminated iron. While the cores are shown schematically it will be understood that any core may be in the form of E–1 laminations, but C-cores or other conventional arrangement providing a linear current voltage relationship would be suitable for the purposes of the invention. Each of the cores carries one winding and is designed to provide a linear current voltage characteristic relationship for the supply current. The linearity of current-voltage characteristic is achieved preferably by providing an air gap in the magnetic circuit of each core. In accordance with known design technique the dimension of the required air gap will depend upon the current range of the linear current voltage characteristic referred to herein also as linear reactances.

The three cores 20b, 21b and 22b each carry one winding. One terminal of each of these three windings is connected to the common start point 22a, and the other terminal of each winding is connected to the corresponding point of the windings 23a, 24a and 25a. The primary structures 20, 21 and 22 are designed to operate in the non-linear part of the B-H characteristic of their cores 20b, 21b and 22b respectively. Operation within this range requires high magnetizing currents supplied by the condensers 26, 27 and 28 described.

Figure 3:
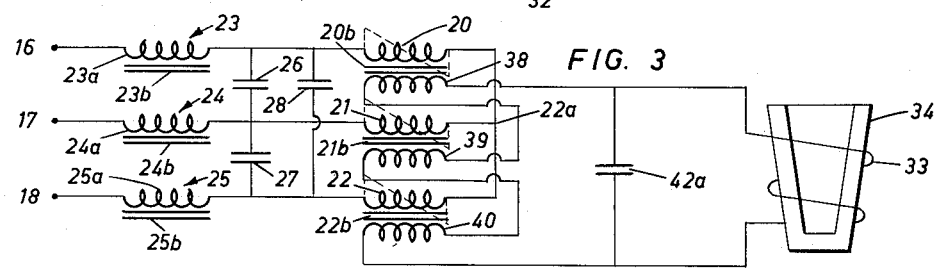
FIGURE 3 is a modification of the system of FIGURE 2 embodying a special design of single phase output connection according to the invention.

A modified system according to the invention is illustrated in FIGURE 3 wherein the single phase output transformer is eliminated by providing the series output windings or secondaries 38, 39 and 40 connected electrically in series and magnetically coupling the cores 21b and 22b. This modification enables a reduction in the number of cores provided. In this case the input winding for the series connected output windings 38 to 40 is provided by the current dependent inductances 20, 21 and 22 connected to the star connection point 22a.

Figure 4:
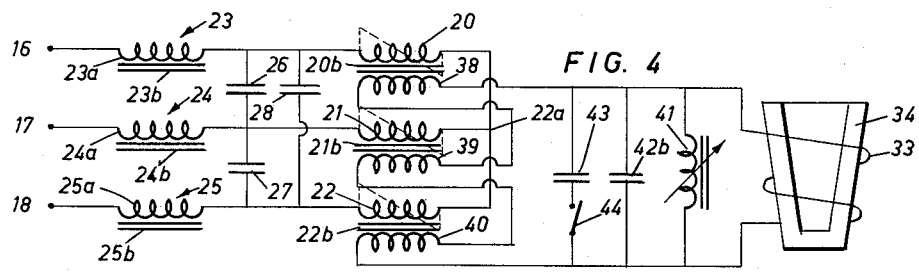
FIGURE 4 is a further modification of the system of FIGURE 3 illustrating a method of voltage regulation.
Figure 8:
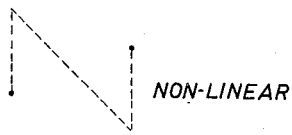
FIG. 8 is a legend clarifying the non-linear dotted line showing of FIGS. 1 and 2.

In FIGURE 4 a modification of the system disclosed in FIGURE 3 will be evident in that voltage regulation is accomplished by providing a variable reactor 41, connected in parallel with condenser 42b, which latter condenser may be paralleled with a further condenser 43 controlled by a manual switch 44 for effecting power factor correction. A similar power regulating means may be utilized with any of the power systems herein proposed.

It should be observed that in the single phase power system of the invention, means are provided for connecting the load, that is, induction heating furnace coil 33 between an effectively neutral point for the source such as the ground point 32 and star connection point 22a for the current dependent inductances. There are a number of methods available for obtaining single phase output power from an effectively neutral point for the source and a star connection point for current dependent inductances. One suitable method is illustrated in FIGURE 2 wherein a single phase transformer 29 is connected directly between the points 32 and 22a.

If the multiphase source has no neutral ground point as in FIG. 2 an artificial neutral point for the source may be provided in the manner indicated in FIGURES 5 and 6 hereinafter described. In the alternative however, single phase output power may be obtained directly in the manner illustrated in FIGURES 3 and 4 wherein the secondary connected windings 38, 39 and 40 obtain single phase output power from between the neutral point 22a and the neutral point of the source effectively provided in the electrical sense by the windings 38, 39 and 40.

The single phase output connections of FIGURES 2 to 6 are equivalent in the electrical and operating sense. These various alternatives merely embody different expedients for obtaining single phase output power of high harmonic frequency from a multiphase source. Whether the multiphase source embodies an actual ground point, an artificial ground point, it will be appreciated that, in accordance with this invention, any one of these various alternatives may be regarded in the operative sense as effectively embodying a neutral point. The output power is therefore extracted according to this invention from an effective neutral point of the source and the star connection point or equivalent of the current dependent inductances which are excited by current through linear reactances serving to isolate the source from harmonics reflected by the current dependent inductances.

Figure 5:
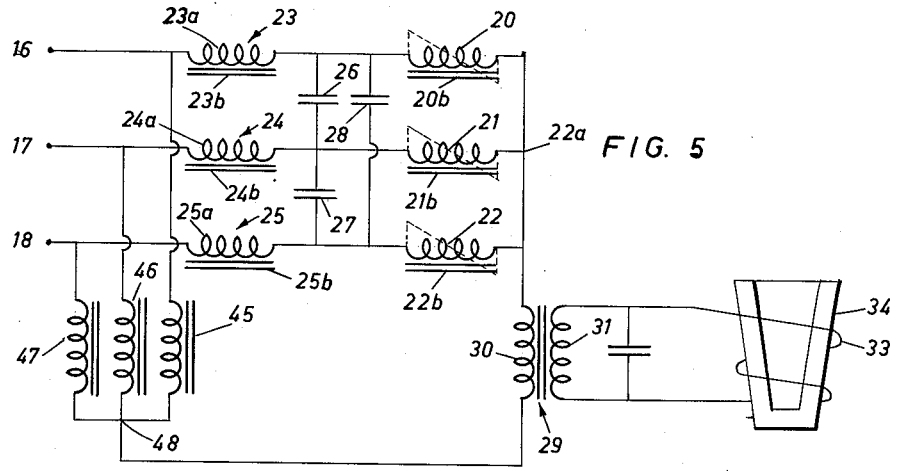
FIGURE 5 illustrates a still further modification of the system of FIGURE 2 illustrating an alternative method of obtaining single phase output.
Figure 6:
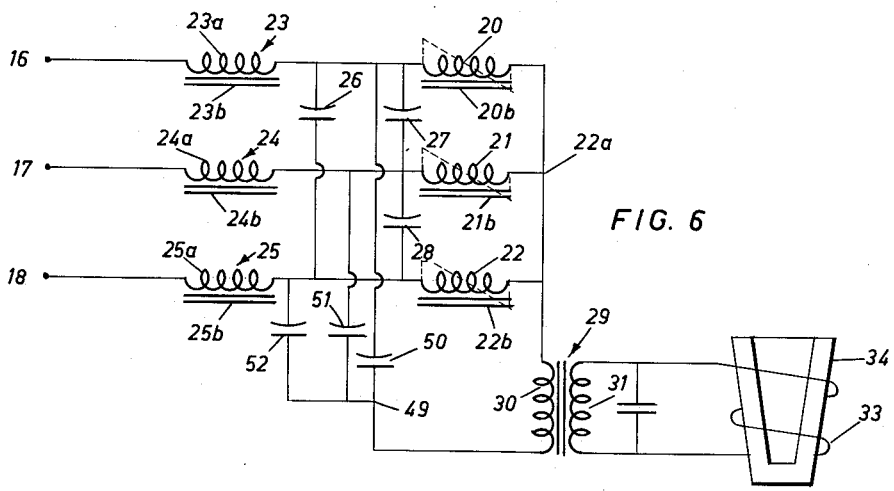
FIGURE 6 is a still further modification of the system of FIGURE 2 illustrating a further alternative method of obtaining a single phase output.

In FIGURES 5 and 6 two alternative methods of providing an artificial neutral point for the source are illustrated wherein, in the one case, the inductances 45, 46 and 47 connected to terminals 16, 17 and 18 respectively provide a star connection neutral point 48 serving as an artificial ground point to which transformer 29 may be connected similar to the connection of FIGURE 2, wherein the transformer is effectively between ground and the star connection point 22a.

In FIGURE 6 an artificial ground point 49 is provided by condensers 50, 51 and 52 connected to the separate phases. Single phase output voltage is therefore developed between the neutral point 49 and the star connection point 22a therefore, to energize a single phase output transformer 29 as before.

In the system of the invention expressed in the alternatives set forth, it will be apparent that, in the generic sense, the invention concerns a single phase high frequency power supply rich in harmonic content. The system embodies a multiphase source of predetermined frequency and means defining an effectively neutral point therefor. Current dependent inductances are provided for energization by the source, and have an independent neutral point. Linear current inductances are disposed electrically between each of the current dependent inductances and the source, and serve to isolate the latter from harmonics reflected by the current dependent inductances. The linear reactances also serve to develop non-sinusoidal voltages phase to phase between the linear and non-linear current dependent inductances. Condenser means are disposed phase to phase electrically between the linear current inductances and the current dependent inductances for providing non-sinusoidal exciting current to the current dependent inductances for energizing the latter. Finally, means are provided for connecting a single phase load between the neutral points described to obtain single phase high frequency power characterized by a symmetrically distributed power drawn on the source.

Figure 7:
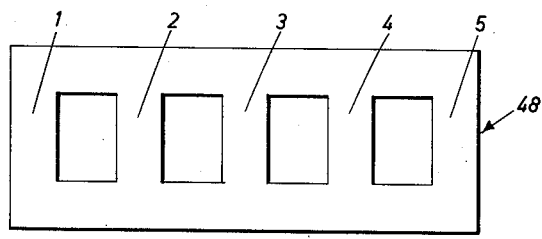
FIGURE 7 is a diagrammatic illustration of one preferred form of core construction useable in the supply system of the invention.

In FIGURE 7 a form of core construction 48 is illustrated. Five core legs designated by numerals 1 to 5 carry the current dependent inductance windings 20, 21 and 22 distributed on legs 2, 3 and 4 or legs 1, 3 and 5. The remaining two core legs which do not carry a primary winding will be conductors for substantially high harmonic flux. Accordingly a single phase output may be obtained readily by placing a single phase winding (not shown) on either or both of the two remaining legs.

Aside from the advantages of the power supply system which will be evident to skilled persons it will be apparent that the input power factor of the power supply system of the invention is very close to unity, that is in excess of 0.9. This result obtains because the excitation current for the current dependent inductances is obtained from excitation condensers charged by the voltage developed between the linear reactances and current dependent inductances, these voltages being distorted in the same manner as the excitation current of the current dependent inductances.

What I claim as my invention is:

1. A power supply system having a multiphase source of alternating current of predetermined frequency and adapted to deliver a single phase output power comprising in combination; inductance means for each phase of source including means defining a star connection point therefor and a neutral point provided at the source, a current dependent inductance for each phase of said source energizable by the latter having a current voltage relationship which is non-linear for each phase of said source; a reactance having a current voltage relationship which is linear disposed between the current dependent inductance and the corresponding phase of said source providing a high impedance path for harmonic components of said frequency reflected by said current dependent inductance; said linear reactance developing non-sinusoidal voltages between said linear reactance and said current dependent inductance; condensers interposed between the said current dependent inductances for providing a low impedance path for harmonic currents passing non-sinusoidal current to said current dependent inductances, means for connecting a single phase load between said star connection point and said neutral point and means to obtain high frequency power symmetrically distributed with respect to said source; the relationship between the said low impedance means and the high impedance means being such that a substantial unity power factor results at the source.

2. A power supply system having a multiphase source of alternating current of predetermined frequency and adapted to deliver a single phase output power comprising in power combination; a current dependent inductance for each phase of said source energizable by the latter having a current voltage relationship which is non-linear for each phase of said source; a star connection point for said current dependent inductances; a reactance having a current voltage relationship which is linear disposed between the current dependent inductance and the corresponding phase of said source providing a high impedance path for harmonic components of said frequency reflected by said current dependent inductance; said linear reactance developing non-sinusoidal voltages between said linear reactance and said current dependent inductance; condensers interposed between the said current dependent inductances for providing a low impedance path for harmonic currents passing non-sinusoidal current to said current dependent inductances, said condensers including means defining an electrical neutral point serving effectively as the neutral point for said source, means for connecting a single phase load between said neutral and star connection points, and means thereby to obtain single phase high frequency power symmetrically distributed with respect to said source; the relationship between the said low impedance means and the high impedance means being such that a substantial unity power factor results at the source.

3. A power supply system having a multiphase source of alternating current of predetermined frequency and adapted to deliver a single phase output power comprising in combination; inductance means for each phase of source including means defining a star connection point therefor, an electrical neutral point available at the source, a current dependent inductance for each phase of said source energizable by the latter having a current voltage relationship which is non-linear for each phase of said source; a reactance having a current voltage relationship which is linear disposed between the current dependent inductance and the corresponding phase of said source providing a high impedance path for harmonic components of said frequency reflected by said current dependent inductance; said linear reactance developing non-sinusoidal voltages between said linear reactance and said current dependent inductance; condensers interposed between the said current dependent inductances for providing a low impedance path for harmonic currents passing non-sinusoidal current to said current dependent inductances, means for connecting a single phase load between said star connection point and said neutral point and means to obtain high frequency power symmetrically distributed with respect to said source; the relationship between the said low impedance means and the high impedance means being such that a substantial unity power factor results at the source.

References Cited in the file of this patent

UNITED STATES PATENTS

| | | |
|---|---|---|
| 1,537,371 | Petersen | May 12, 1925 |
| 2,313,440 | Huge | Mar. 9, 1943 |
| 2,367,625 | Short | Jan. 16, 1945 |
| 2,383,177 | Drake | Aug. 21, 1945 |
| 2,451,189 | Alexanderson et al. | Oct. 12, 1948 |
| 2,727,159 | Sunderlin | Dec. 13, 1955 |

UNITED STATES PATENT OFFICE
CERTIFICATE OF CORRECTION

Patent No. 3,040,230                                    June 19, 1962

Paul P. Biringer

It is hereby certified that error appears in the above numbered patent requiring correction and that the said Letters Patent should read as corrected below.

Column 2, line 41, for "of" read -- and --; column 3, line 23, for "start" read -- star --.

Signed and sealed this 16th day of October 1962.

(SEAL)
Attest:

ERNEST W. SWIDER                                   DAVID L. LADD
Attesting Officer                                   Commissioner of Patents